United States Patent
Bhunia et al.

(10) Patent No.: US 11,720,654 B2
(45) Date of Patent: Aug. 8, 2023

(54) TIMED UNLOCKING AND LOCKING OF HARDWARE INTELLECTUAL PROPERTIES

(71) Applicant: University of Florida Research Foundation, Inc., Gainesville, FL (US)

(72) Inventors: Swarup Bhunia, Gainesville, FL (US); Abdulrahman Alaql, Gainesville, FL (US); Aritra Dasgupta, Gainesville, FL (US); Md Moshiur Rahman, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 0 days.

(21) Appl. No.: 17/549,184

(22) Filed: Dec. 13, 2021

(65) Prior Publication Data

US 2022/0188387 A1 Jun. 16, 2022

Related U.S. Application Data

(60) Provisional application No. 63/126,149, filed on Dec. 16, 2020.

(51) Int. Cl.
| | |
|---|---|
| G06F 21/14 | (2013.01) |
| G06F 21/12 | (2013.01) |
| G06F 21/75 | (2013.01) |
| G06F 21/72 | (2013.01) |

(52) U.S. Cl.
CPC .......... *G06F 21/123* (2013.01); *G06F 21/14* (2013.01); *G06F 21/72* (2013.01); *G06F 21/75* (2013.01)

(58) Field of Classification Search
CPC .......... G06F 21/14; G06F 21/72; G06F 21/75; G06F 21/82; G06F 21/121
See application file for complete search history.

(56) References Cited

U.S. PATENT DOCUMENTS

| | | | | |
|---|---|---|---|---|
| 2010/0199077 | A1* | 8/2010 | Case | G06F 11/3656 713/1 |
| 2011/0109425 | A1* | 5/2011 | Kan | G06F 21/73 340/5.2 |
| 2021/0406405 | A1* | 12/2021 | Tanami | H04L 9/0825 |

\* cited by examiner

*Primary Examiner* — Nelson S. Giddins
(74) *Attorney, Agent, or Firm* — Thomas | Horstemeyer, LLP

(57) ABSTRACT

The present disclosure provides systems and methods for timed unlocking and locking of hardware intellectual properties obfuscation. One such method includes determining whether received key inputs match a functional key sequence of an integrated circuit or a test key sequence of the integrated circuit; permanently enabling operation of the integrated circuit responsive to the received key inputs being determined to be a functional key sequence for permanently enabling operation of the integrated circuit; temporarily enabling operation of the integrated circuit responsive to the received key inputs being determined to be the test key sequence for temporarily enabling operation of the integrated circuit to perform testing of the functionality and disable thereafter; and locking sequential logic and combinational logic of the integrated circuit if the received key inputs are determined to not be either the functional key sequence or the test key sequence. Other systems and methods are also provided.

20 Claims, 12 Drawing Sheets

TIMED UNLOCKING AND LOCKING OF HARDWARE INTELLECTUAL PROPERTIES

CROSS-REFERENCE TO RELATED APPLICATION

This application claims priority to U.S. provisional application entitled, "Timed Unlocking and Locking of Hardware," having Ser. No. 63/126,149, filed Dec. 16, 2020, which is entirely incorporated herein by reference.

BACKGROUND

The security of hardware intellectual properties (IPs) has been a rising concern. Accordingly, hardware IPs used in diverse electronic systems face several critical security issues during their life cycle, including piracy, reverse engineering, and extraction of design secrets. For example, around $250 billion is lost every year due to IP piracy, which causes a devastating impact on the semiconductor industry around the world. As such, attackers aim to utilize all capabilities to extract secret information or design aspects of the IPs under attack to clone those IPs and create counterfeits. Their techniques became more sophisticated and advanced as tools and equipment have become more accessible and easier to obtain. Many IP protection techniques have been implemented to protect these IPs in their life cycle. One potential solution that IP vendors may apply is design obfuscation, where obfuscation mechanisms are inserted into the circuit to lock the functionality of the IP and/or hide critical information. However, in parallel, a number of functional and structural attacks on obfuscation has been discovered by the research community to break the protection provided by the existing obfuscation schemes. In addition, to perform testing of the locked IPs, IP vendors will need to send the unlocking key to untrusted testing entities which leads to abusing the obfuscated version of the IP, as well.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1A:
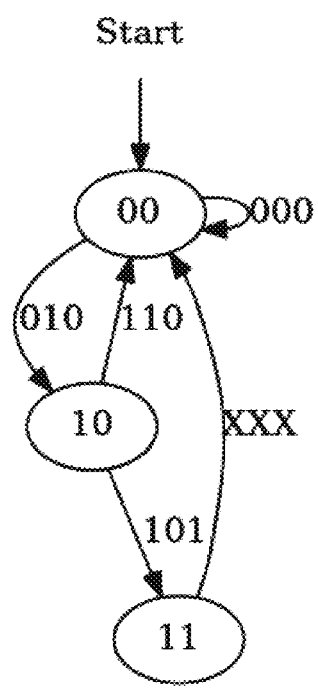
FIG. 1A shows a state transition graph of a basic Finite State Machine (FSM) of two flip-flops, where the combination of inputs required to make a transition is mentioned in each edge of the graph in accordance with the present disclosure.

The present disclosure describes various embodiments of systems, apparatuses, and methods for Timed Unlocking and Locking of hardware Intellectual Properties (IPs) (TULIP) obfuscation. Under this type of framework, two modes of operations are offered: a first mode that unlocks the functionality of a hardware IP such that the functionality is enabled permanently, and a second mode that unlocks the functionality of the hardware IP for a pre-determined period of time (e.g., a temporary period of time). The latter addresses the issue of untrusted facility testing, where the IP can be accessed by untrusted parties to perform system-level verification.

Obfuscation techniques have significantly been evolving over the past years, where some are applied to the early stages of the IP's life cycle (functional) and others are applied in the fabrication stage (physical). Physical obfuscation techniques are post-silicon measures that are applied to the basic structure of logic elements. By adding dummy contacts, these logic elements are being made non-distinguishable, which adds a layer of protection against physical attacks. Functional obfuscation techniques are applied to register-transfer-level (RTL) or gate-level netlists. Based on the IP's lifecycle, the present disclosure focuses on functional obfuscation, since IP piracy attacks can be applied at any development stage and not only after fabrication. In functional obfuscation, key-controlled logic locking functions are added to the design. These locking circuitries are locked when the input key pattern is incorrect and cause the primary output to produce invalid values.

In accordance with the present disclosure, a framework is presented for Timed Unlocking and Locking of hardware IPs (TULIP). TULIP has been developed to protect the locked circuit against malicious activities performed in untrusted facilities, where the key has to be revealed for the functional tests to be performed. In the present disclosure, state space obfuscation techniques are enhanced to support a temporarily unlocking of the circuit, where functionality is restored for a pre-determined period of time before the functionality of the circuit is locked again. The TULIP approach is tested to be scalable, secure, and lightweight.

In accordance with various embodiments of the present disclosure, TULIP offers two modes of operations: a permanently enabled mode and a temporarily enabled mode. For example, a Finite State Machine (FSM) can be implemented that monitors the unlock period and terminates the functionality of the hardware IP when the configured time-out period is reached. In various embodiments, the functionality of added obfuscation finite state machines can be extended to act as a counter for use in the temporarily enabled mode. Further, in various embodiments, high entropy nets from the original circuit can be randomly selected and associated with the counter used in the temporarily enabled mode, where the state transition depends on the switching activity of the selected net. Alternatively or in addition to, the existing state space obfuscation can be enhanced to allow testing the manufactured IC without giving away the functional key for use in the permanently enabled mode. As such, the present disclosure presents a unique algorithm of deriving a test key (for use in the temporarily enabled mode) that relates to the testing of a hardware IP chip that has state space obfuscation being applied on. To the best of the inventors' knowledge, this is the first work that introduces unlocking of obfuscated design for a certain period of time for testing purposes and addresses the fact that the testing facility will not need the functional key to test the chip.

Even though logic locking and obfuscation addresses the fact that a locked design cannot be used without the access of the unlocking/functional key by unauthorized entities, testing of the manufactured locked chip has not been considered. Before making the chips available to the market or end users, a number of functional and structural tests need to be performed by the untrusted testing facilities. For functional tests, it is a necessity and/or a regulation to test the intended functional behavior by applying test patterns and generating expected outputs from the chip to make sure that there is no functional defect due to the manufacturing process. However, such tests require the chip to be fully functional, hence, requiring the unlocking/functional key to be used. As an IP owner, sending the unlocking key to the testing facility violates the objective of locking the design of the IP chip. As evident from the previous works in the field of obfuscation, none of the existing approaches consider the fact that the testing facility will need to have access to the unlocking/functional key after the chip has been manufactured. Thus, there is a need for a protocol or system that allows testing the manufactured chip as well as keeping the unlocking/functional key of the design a secret.

In most cases, a realistic or commercial IP contains control logic that dictates the operation of the IP. Based on the current operational state and external inputs to the IP, control logic decides the next state of the operation. A finite number of operating states are encoded using a behavioral finite state machine which constitutes the control logic block of the IP. In a synthesized gate-level netlist, an FSM is a group of flip-flops with combinational logic gates that creates next state logic (inputs of the flip-flops) based on the current state (outputs of flip-flops).

Since a simple example can ease the concept of the operation and structure of an FSM, let us consider a design that operates in three unique states {00; 10; 11} which are to be encoded using an FSM. In each state of operation, the FSM generates some outputs, commonly termed as control signals that can be used by the data path of the design. Table 1 (below) reflects the state transition conditions of the FSM. A corresponding state transition graph (STG) is shown in FIG. 1A.

TABLE 1

| Inputs | | | Current State | | Next State | |
|---|---|---|---|---|---|---|
| In2 | In1 | In0 | $Q_{1c}$ | $Q_{0c}$ | $Q_{1n}$ | $Q_{0n}$ |
| 0 | 0 | 0 | 0 | 0 | 0 | 0 |
| 0 | 1 | 0 | 0 | 0 | 1 | 0 |
| 1 | 1 | 0 | 1 | 0 | 0 | 0 |
| 1 | 0 | 1 | 1 | 0 | 1 | 1 |
| X | X | X | 1 | 1 | 0 | 0 |

Figure 1B:
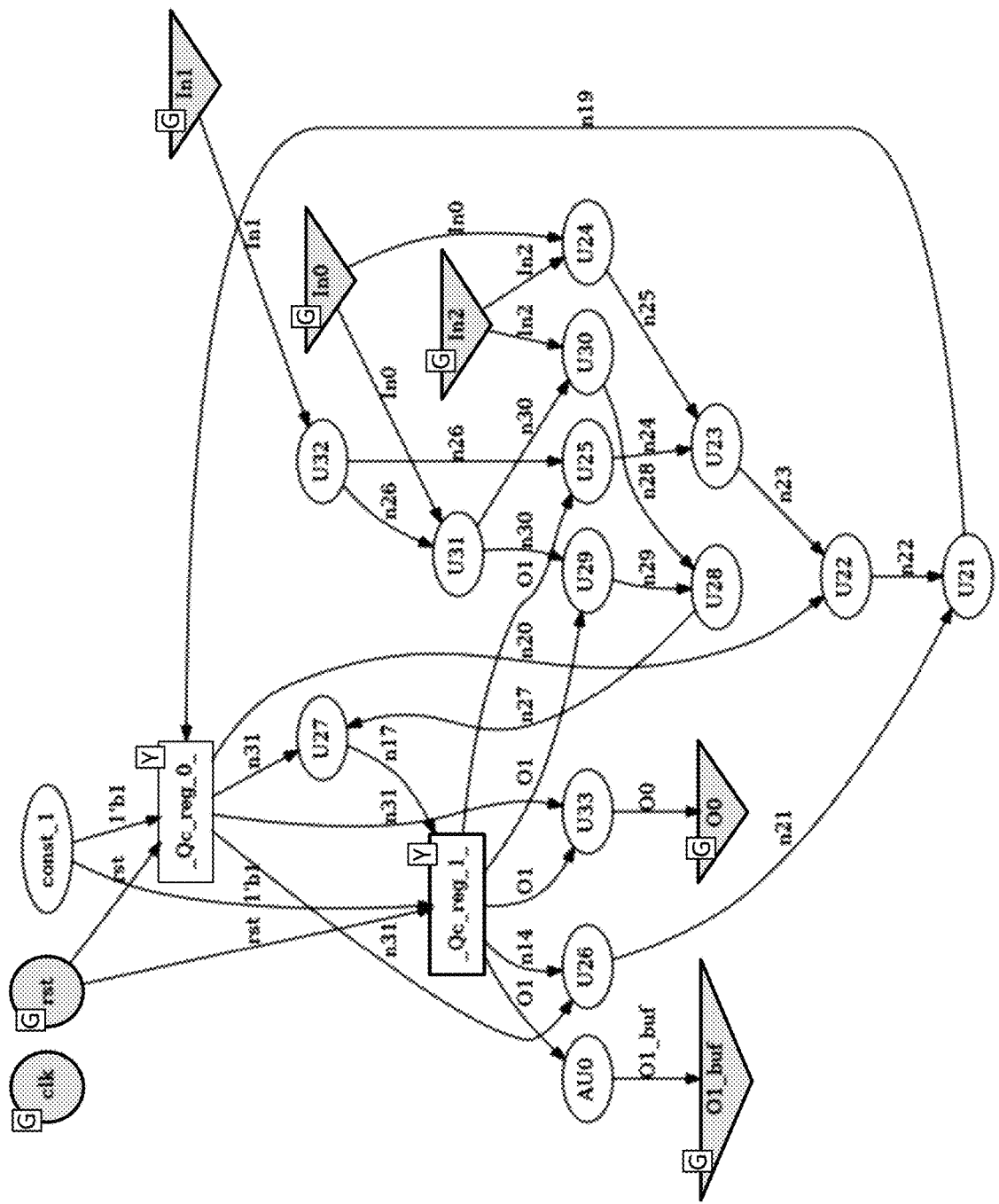
FIG. 1B shows a structure of a netlist having primary inputs/outputs, flip-flops, and combinational cells in accordance with the present disclosure.

The state transition table can be represented in behavioral hardware description language (HDL), e.g., Verilog/VHDL which can be synthesized to generate a gate-level netlist of a design. Accordingly, the netlist contains a set of combinational gates and sequential flip-flops which can be illustrated as a connected graph, as shown in FIG. 1B. The figure shows a structure of a netlist where "G" instances (marked with a "G") are primary inputs/outputs, "Y" shapes (marked with a "Y") are flip-flops, and the rest are combinational cells in accordance with the present disclosure.

In a typical hardware IP, the size of the FSM, or in other terms, the number of operational states will be few. In addition, the entirety of the available state space may not be utilized. For example, the FSM, discussed in relation to FIGS. 1A-1B, has three operational/reachable states which will require the netlist to contain two flip-flops (considering that binary encoding is being used). However, two flip-flops can reach a maximum of four states ($2^{number\ of\ flip\text{-}flops}$). Due to not using all possible states, the reachability of the FSM remains low, such that less reachability of the state space makes it easier for an attacker to reverse engineer the FSM and figure out the operation of the control logic of the IP. In addition, the common structure of an FSM in a gate-level design is a group of flip-flops with direct feedback paths from their outputs to the inputs, which also adds up to the advantage of the attacker to completely isolate the small state machine and reverse engineer more precisely. These two factors are detrimental and serious threats to the life cycle of the IP, leading to piracy, cloning, and re-using of IP. Hence, to increase the reachability of the state space as well as to perform significant transformation of the structure of the netlist (to disguise the intended functionality of the IP), state space obfuscation can play a vital role.

As an overview, hardware obfuscation is an emerging topic in the field of hardware IP protection. In the last decade, several obfuscation techniques have been proposed. Since most of the efforts have been evolving in combinational logic obfuscation, sequential logic obfuscation field has a lot to be explored. In addition, few of the sequential obfuscation techniques have tried to address the vulnerability associated with the relatively small state space of a design.

For example, Boosted FSM (BFSM) involves the concept of using an unreachable state and incorporates modification of FSM flip-flops in a way that the FSM is forced to power-up from an unreachable state. Accordingly, a random unit block (RUB) is placed inside the design to generate the random initial unreachable state. Once the design powers up from the unique unreachable state, multiple transition paths are available to be traversed to reach the pre-modified initial state of the FSM by applying a sequence of inputs that essentially becomes the un-locking key sequence. BFSM mostly modifies the state transition graph of the FSM keeping the FSM structure intact. However, BFSM is based on the assumption that the attacker cannot access the design flip-flops. Thus, the threat model does not consider that the gate-level design can be acquired by the manufacturing foundry. Such assumptions, vulnerabilities related to the security of the RUB, and minimal to zero structural transformation weaken the BFSM scheme, such that an intelligent or knowledgeable attacker can break into the design by bypassing or removing the extra states.

As another example of a pre-existing sequential obfuscation technique, HARPOON incorporates an addition of an extra entrance FSM that controls XOR/XNOR gates that are being placed as obfuscation logic in the combinational logic of a gate-level netlist. Upon application of a pre-defined sequence of patterns through primary inputs, the added FSM can be brought to a normal mode of operation and configure the XOR/XNOR gates to retain the intended functionality of the design. As such, a wrong key will keep the added FSM in the obfuscated state and internal nodes will be inverted to corrupt the operation of the design. Although HARPOON essentially increases the number of states by introducing a number of flip-flops in an extra FSM, there is no dependency of the added FSM on the existing FSM in the design and vice versa, which means completely independent state transitions in two different FSMs happen in the design. Such isolated FSM insertions can easily be broken by reverse engineering the added FSM using Automated Test Pattern Generation (ATPG) tools and other structural attacks.

Flip-Flop Output Inversion is another example of a pre-existing sequential obfuscation technique. Here, a technology mapped gate-level netlist contains a number of flip-flops, where each of the flip-flops contain two outputs (usually Q and $\overline{Q}$). A scan guided obfuscation technique inserts a multiplexer to the output of the flip-flops where multiplexer inputs are connected to Q and $\overline{Q}$, and the multiplexer output is connected to the combinational logic that was originally at the output of the flip-flop. A select pin of the multiplexer is driven by external input of the design which becomes the key input, as in combinational logic obfuscation. By applying a correct key bit to the key input, either Q or $\overline{Q}$ will be passed to the combinational logic. A wrong key will create an inversion of the required value and will create a non-functional behavior. Such inversion modifies the state encoding only. However, states are not being protected from being known to the attacker as the state space (as well as the structure of the FSM) is not modified, which makes the inversion vulnerable to a number of structural attacks including SAT attacks.

Figure 2:
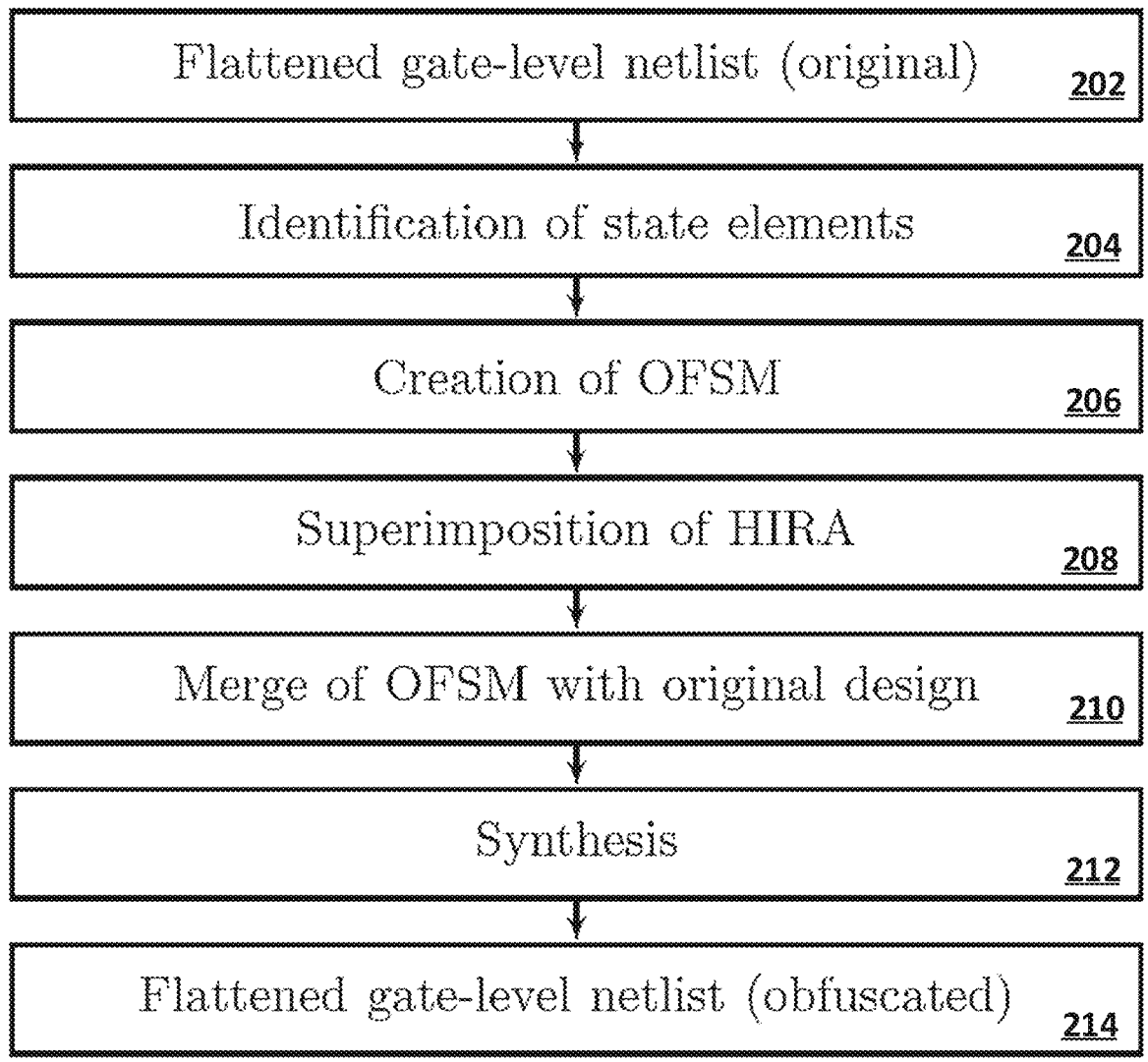
FIG. 2 shows a flow chart of an exemplary state-space obfuscation method in accordance with various embodiments of the present disclosure.

In accordance with various embodiments of the present disclosure, an exemplary obfuscation methodology helps to protect a hardware intellectual property (IP) from reverse-engineering (RE), piracy, and malicious modifications by locking the design at the finite state machine (FSM) level of abstraction, before the IP is transferred to an offshore untrusted foundry or design facility for fabrication. Unlike existing logic locking approaches, which aim at locking circuits by inserting key gates at strategic places of a combinational logic block, an exemplary obfuscation approach transforms and locks the embedded finite state machine of a design. This type of an exemplary state space obfuscation approach for gate-level IP blocks is scalable and can quantify the level of security of the obfuscated design. Such methodology applies to any sequential design and locks the design by performing both sequential and combinational locking. The flow chart for the complete obfuscation approach is shown in FIG. 2. The steps of the flow chart include flattening (202) a gate-level netlist of a circuit design; identifying (204) state elements, creating (206) an obfuscation finite state machine (OFSM); superimposing (208) Highly Reachable Automata (NIRA) on top of the original design; merging (210) the OFSM with the original design; synthesizing (212) the gate-level netlist; and flattening (214) the gate-level netlist for the obfuscated circuit design.

Figure 3:
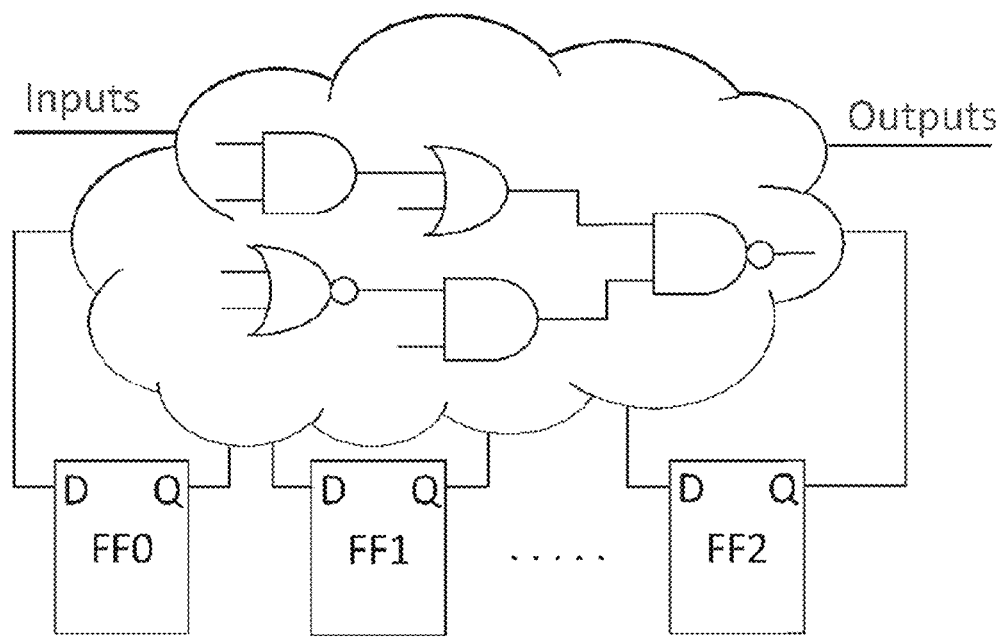
FIG. 3 shows a sequential design of a finite state machine in accordance with the present disclosure.

For the flattened gate-level netlist, an exemplary obfuscation approach applies to the gate-level abstraction of the hardware description language and to the design, which has sequential logic in it. Before insertion of the locking circuitries, the design can be flattened to remove any hierarchy. The next step to obfuscate a design sequentially is to identify control path state elements (e.g., state flip-flops) that constitute the FSM within the gate-level netlist. In various embodiments, pseudo-state elements are additionally identified that impact a transition of the FSM, wherein the pseudo-state elements constitute data path flip-flop circuit elements that impact a state transition of the FSM. In various embodiments, the modification of the data path flip-flops is omitted unless any control path or state flip-flops are not able to be found. In general, FSMs are sources of state elements that generate the control logic to guide the operation of a circuit. A high-level diagram of a state machine is shown in FIG. 3. The commonly accepted criteria of a flip-flop to be a state flip-flop is that it will have a feedback path that comes out from the output port and enters the input port through some combinational logic or a combination of sequential and combinational logic. This feedback path differentiates between the state flip-flops and data path flip-flops—which have no feedback path. As shown in FIG. 3, all three flip-flops (FF0, FF1, FF2) are state flip-flops.

Figure 4:
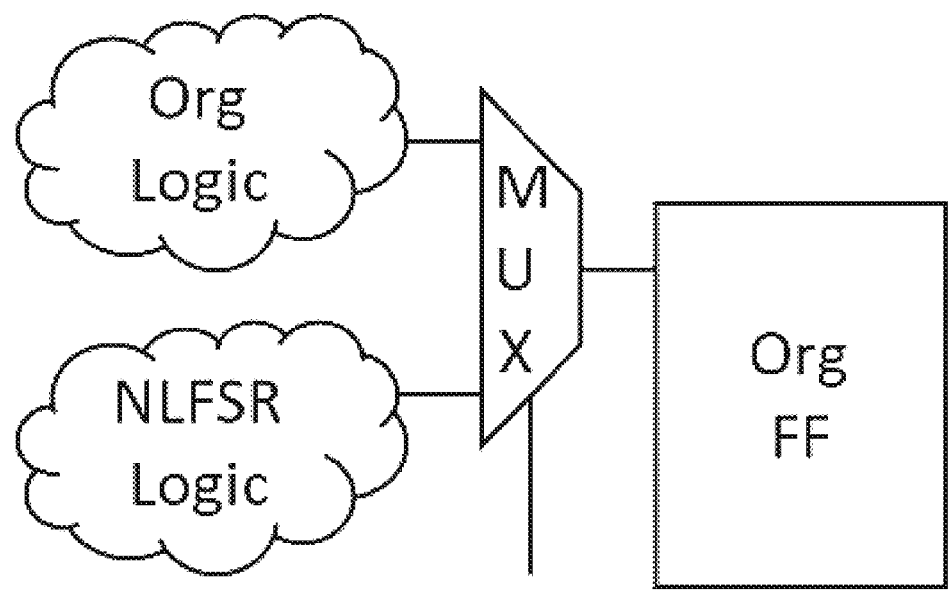
FIG. 4 shows a gate-level superimposition of Non-Linear Feedback Shift Register (NLFSR) logic on top of a state flip-flop in accordance with various embodiments of the present disclosure.

One goal of obfuscation is to increase the operating state space of the design. To achieve high reachability, Highly Reachable Automata (HIRA) is superimposed on top of the original design FSM and to do that, the existing design flip-flops are used. In parallel to the original design logic at the input of a state flip-flop, next state logic of a non-linear feedback shift register (NLFSR) can be added using a multiplexer. The gate-level superimposition of NLFSR logic on top of a state flip-flop is shown in FIG. 4. Now the same flip-flop (or FSM) can operate in two modes—a normal mode (original FSM) and an obfuscated mode (NLFSR mode) based on the application of the key values.

Numerous sizes and configurations of NLFSRs are possible for the superimposition step that makes use of known structural signatures of the FSMs by an adversary extremely challenging. Moreover, re-synthesis of the design with the NLFSRs leads to resource-sharing and logic optimization that makes isolation of the NLFSRs difficult. Using NLFSRs can attribute to less area overhead, a non-linear feedback path, and 100% reachability. Note that even though NLFSRs can be used as FSMs to superimpose, other highly reachable FSMs, e.g., a custom FSM, can also be used to improve security and reduce design overhead.

Figure 5:
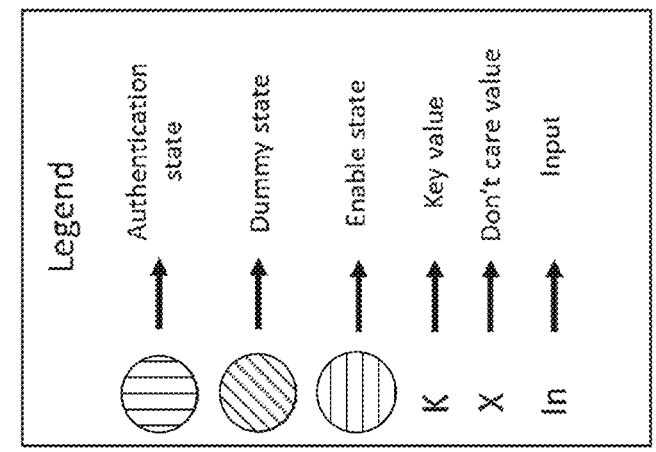
FIG. 5 shows a state transition diagram of an Obfuscation Finite State Machine (OFSM) in accordance with various embodiments of the present disclosure.
Figure 5:
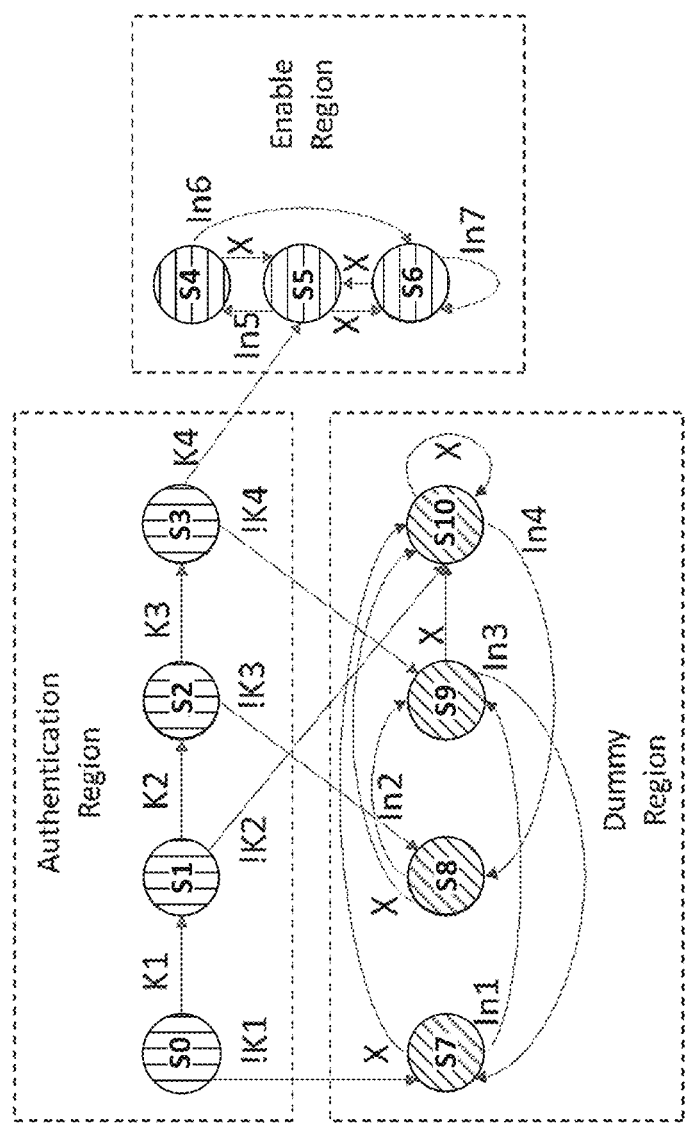

For obfuscation FSM creation, additional FSMs called obfuscation FSMs (OFSMs) can be deployed which take certain values as input conditions through primary input ports to traverse through certain states to introduce a locking mechanism. Accordingly, the input values to each OFSM state transition are considered as key values, which essentially are the unlocking keys of the design. The state transition diagram of a sample OFSM, which can be inserted into the design, is shown in FIG. 5. Based on the size of the design, a number of OFSMs may vary from one to many. The added FSMs are random in number of flip-flops, fan-in, and fan-out cone size, number of states in each FSM, etc. These FSMs are generic state machines which have three regions of operations—an authentication region, a dummy region, and an enable region. Each of these regions is a collection of a number of states. OFSMs use primary inputs as well as some internal nets of the original design (intended to be obfuscated) as inputs to assign some conditions for the state transitions through these regions. Provided that the correct key values are applied through the primary inputs, the FSM will traverse through the authentication region and reach the enable region. If a wrong key is applied at any point of this traversal, FSM will enter the dummy region and end up being trapped in the dummy region, since there is no path back to any of the other regions. To avoid periodic state transitions, the conditions of state transitions in a dummy region have been made distinct and random to incorporate random transitions which allow hiding the added FSMs. All three regions can generate a set of enable signals which, if correct, will enable the normal mode of operation of the design.

Upon the application of the correct key values, OFSMs enter into the normal mode of operation and activate the obfuscated flip-flops in the design to act as a part of the original design FSM. In the authentication and dummy regions/states, enable signals can have random values, which in return may enable a random part of the design in each clock cycle, since the enable signals can randomly switch throughout all the state transitions. The random and continuous switching is intentional and helps to hide the enable signals. However, to avoid unusual switching activity in the obfuscation circuitries, the original design switching activity is made similar to the obfuscation circuitries. Based on the number of state flip-flops in a design and other design constraints, the number of OFSMs can be more than one.

Figure 6:
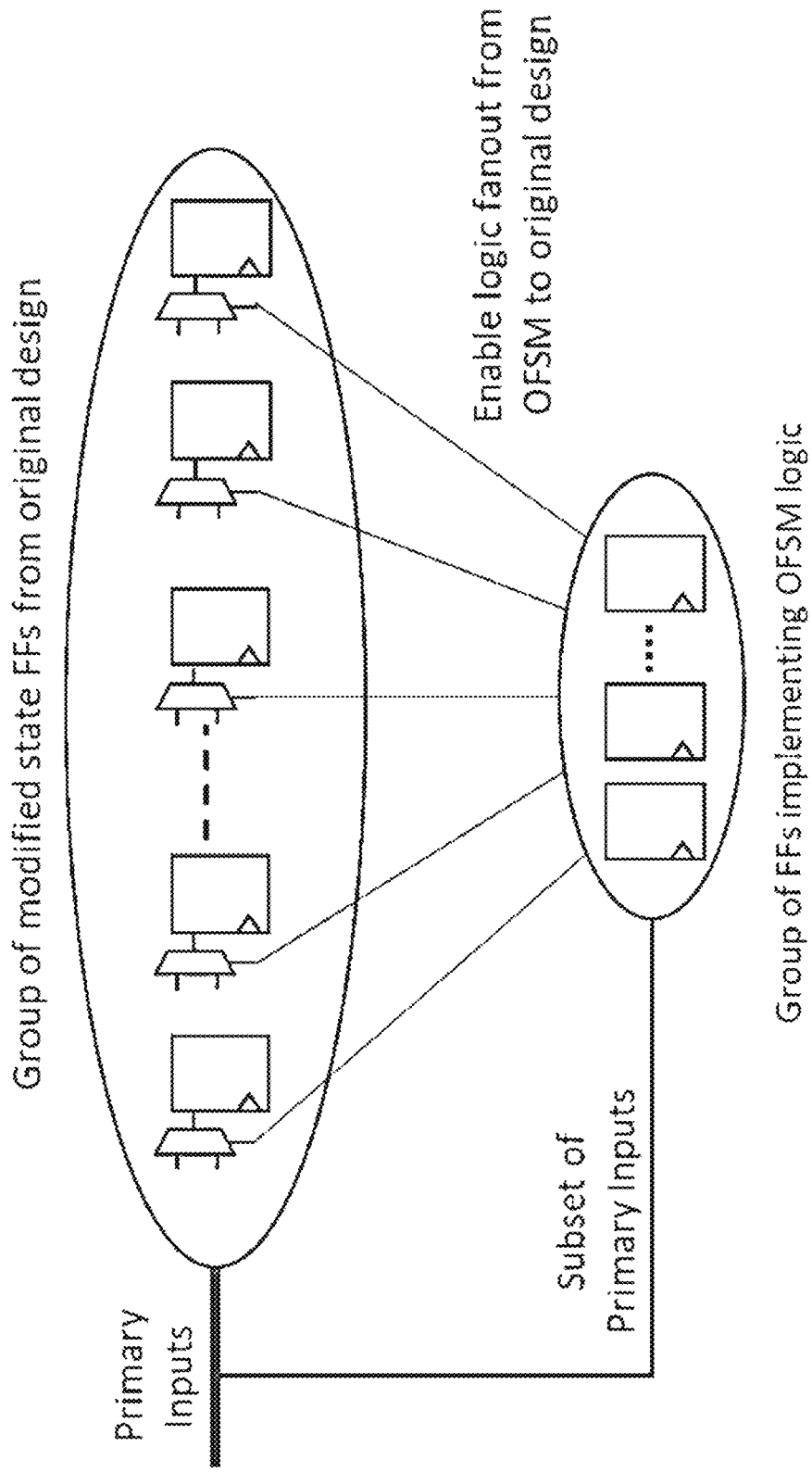
FIG. 6 shows a mechanism for merging OFSMs with an original design of a hardware IP in accordance with various embodiments of the present disclosure.

In order to merge the OFSM with the original design, OFSMs and NLFSR logic are added in parallel to the original FSM logic with the help of a multiplexer. While merging the OFSMs with original design, the primary inputs to the OFSMs are replaced with the existing primary inputs to the original design to avoid adding extra key inputs (which makes it SAT resistant) and the enable signals generated from the OFSMs drive the select input of the multiplexers which are placed in front of the state flip-flops. The basic mechanism of merging OFSMs with original design is shown in FIG. 6. Once the correct keys are applied, all the multiplexers will be configured to select the original logic branch and switch to the normal mode of operation of the design. Otherwise, NLFSR logic branches will be chosen, and the functionality of the design will be corrupted by entering the extended and non-functional state space of the design.

As a non-limiting example, one or more extra FSM elements can be added using a multiplexer to an input of individual ones of a plurality of target elements of the integrated circuit design in parallel with original design logic at the input of the target element, such that the plurality of target elements constitute the identified control path state elements and pseudo-state elements. The one or more extra FSM elements can be driven by an output of an obfuscation finite state machine that accepts a subset of the key inputs corresponding to a functional key sequence for facilitating a permanent mode of operation for the integrated circuit design or the subset of the key inputs corresponding to a test key sequence for facilitating a temporary mode of operation of the integrated circuit design until occurrence of a defined event, such that occurrence of the defined event causes a corruption of the functionality of the integrated circuit design, where an input of incorrect keys that do not correspond to the functional key sequence and the test key sequence cause the corruption of the functionality of the integrated circuit design.

After completion of the tasks mentioned above, the obfuscated gate-level design is provided. However, to remove any signature and hierarchical boundaries, synthesis of the obfuscated gate-level design is performed. Due to the synthesis process and logic optimization, the obfuscation circuitries share logic with the original design and prevent structural signature, isolation of the added logic, and other potential attack vectors.

As discussed previously, state space obfuscation allows applying a key sequence to unlock the obfuscated design before using the design for its intended functionality. The unlocking key is the most secret asset of an obfuscated design as the unlocking key allows access to the original functionality of the design. As a result, an IP owner will not be willing to share the unlocking key with anyone who may use the design without authorization, e.g., a post-silicon testing facility. However, for testing an IP chip, access to the unlocking key is a necessity and the IP owners need to share the unlocking key to apply and test the functionality of the chip. Such sharing has no metering at all and leads to the same vulnerability that obfuscation tries to address. In order to avoid giving the testing facility access to the functional or unlocking key, the present disclosure presents the concept of timed obfuscation, TULIP, that obfuscates the design as well as allows unlocking of design for a certain period of time and perform testing within that period of time. Since TULIP is a dynamic or periodic key application, it is always possible to generate two unique keys (or sequence of keys) that will enable the normal mode of operation for the same design. In accordance with various embodiments, one of the two unique keys can be used as a functional key, whereas the other can be used as a test key. In order to facilitate the use of the test key and unlock the design for a certain period of time, an exemplary obfuscation approach can be extended by increasing the size (number of flip-flops) of the OFSMs to create more obfuscation states; dividing the state space in two segments: one for applying the functional key to enable the design for functional use until the chip device powers off or resets and one for applying the test key to enable the design for testing purposes which will enable the chip design for a pre-determined period of time to perform the testing only; introducing a timer circuit which is structurally and functionally similar to the existing FSMs (OFSM/original FSM) and gets triggered by the OFSM to unlock the design for certain clock periods; and/or after a time out gets executed by the timer circuit, OFSMs can get triggered to lock the design again.

An exemplary unlocking mechanism can be implemented using obfuscation states in the authentication region. However, to securely validate two sets of keys without any overlap in the state space, the available number of states may not be adequate. Thus, the OFSMs used for obfuscation can be resized by adding the required number of flip-flops to increase the state space of the design, such that each added flip-flop effectively doubles the state space, so more states are available for realizing additional key, enable, and dummy states. It is noted that a larger state space results in increased overheads, so it is important to keep the number of added flip-flops small. For the purpose of authenticating the test key and functional key in parallel, adding 1-2 flip-flops to the existing OFSMs may be sufficient. For example, in order to realize an exemplary timer using the resized OFSM enable states, additional flip-flops can be added, as long as the overheads are below tolerable limits.

In accordance with various embodiments, an enlarged state space is divided into two separate segments to keep the authentication mechanism for the functional key and the test key from interfering with one another. In one embodiment, each resized OFSM is modified to implement two distinct authentication regions. Based on whether the keys are applied correctly, authentication states enable the design using separate enable states for the two different keys or the design transitions to the dummy region, which may also be separated. The segmentation of the OFSM states ensures that the unlocking/functional key can be used to lock the design even if the test key is compromised.

As discussed above, the authentication regions for the test key and the functional key work in parallel. If the test key is successfully applied, the OFSM will traverse through the obfuscation key states, reaching the enable state (temporarily enabled mode) that starts the timer circuit. This enable region cannot be reached using the functional key due to segmentation of the OFSM states. As the objective is to lock the design after a certain period of time, the enable region for the test key is connected to the dummy region (which does not happen in case of the functional key). If the test key application fails, the resized OFSM enters the dummy region for the test key. As a non-limiting example, a data path enable finite state machine can be added to function as the dummy finite state machine and implement the corruption of the functionality of the integrated circuit design, wherein input values to the data path enable finite state machine correspond to a subset of the key inputs that do not match the functional key sequence or the test key sequence.

Once the OFSMs reach their corresponding enable states by checking in the key sequence, a timer circuit remain actives for a certain period of time during which the manufactured chip can be tested. In various embodiments, different counter approaches may be implanted. For example, a first approach, among others, is deterministic which counts for a fixed amount of time. Alternatively, a second approach, among others, is probabilistic and non-deterministic as the time duration varies from design to design even for the same implementation.

For an exemplary first approach, a timer based FSM, which is structurally and functionally similar to OFSMs and obfuscated original FSM flip-flops, is utilized, such that the timer FSM can have n number of flip-flops where $2^n$ is the number of clock cycles through which the design will remain unlocked during testing. The n flip-flops can be added to the original design along with OFSM flip-flops, e.g., in the obfuscated design, there can be three groups of FSMs or FSM flip-flops: (1) state flip-flops from the original design; (2) added state flip-flops as part of OFSMs; and (3) state flip-flops as part of the timer FSM.

Figure 7:
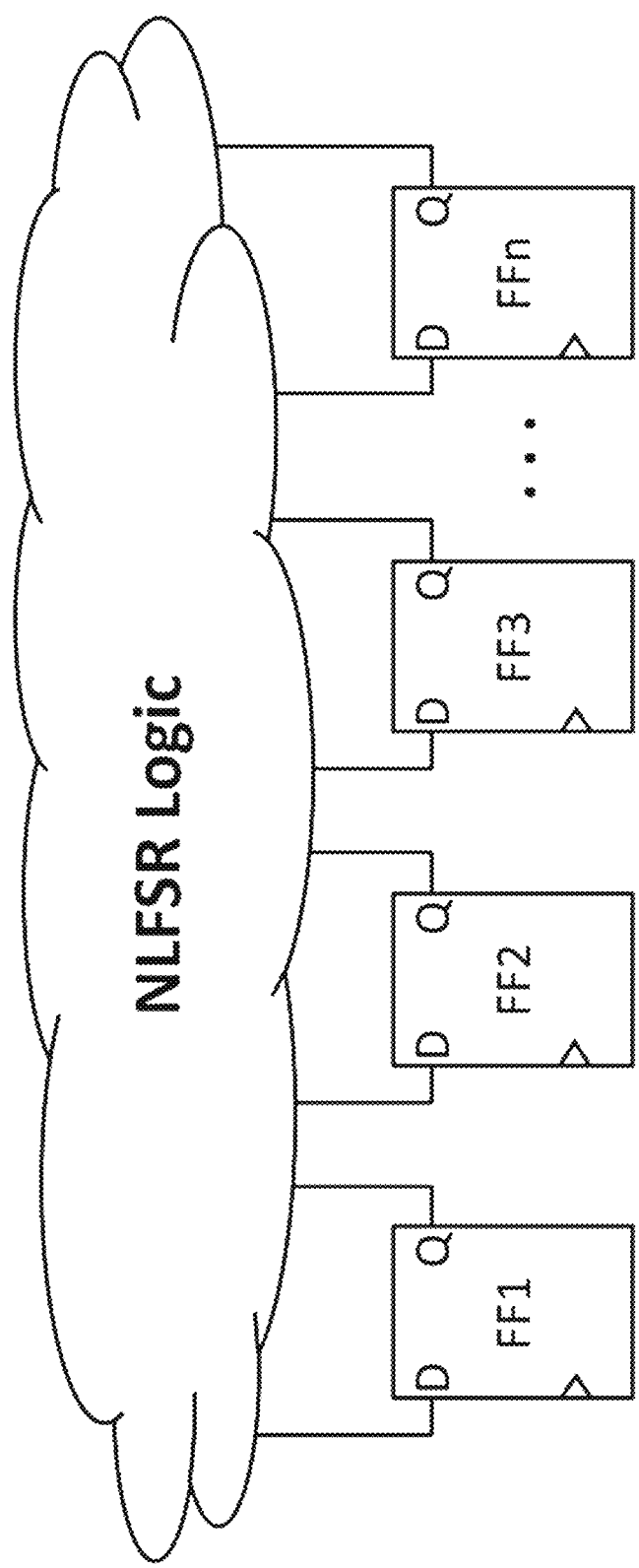
FIG. 7 shows a gate-level structure of an NLFSR as a timer FSM in accordance with various embodiments of the present disclosure.

In accordance with various embodiments of the present disclosure, an exemplary timer FSM can have a number of possible structures and functionality. However, to avoid a unique structure of the timer FSM flip-flops among all three different types of flip-flops, a maximum period NLFSR, which is of low-cost and is secure, can be used as the timer FSM. Accordingly, the gate-level structure of an exemplary timer FSM is shown in FIG. 7. Another reason of using NLFSR is that we use the same structure to be superimposed on top of the original design's state flip-flops. In this way, we create structurally similar FSMs to make sure that the timer FSM does not create any structural signature and cannot be isolated from all three groups of FSMs.

Figure 8:
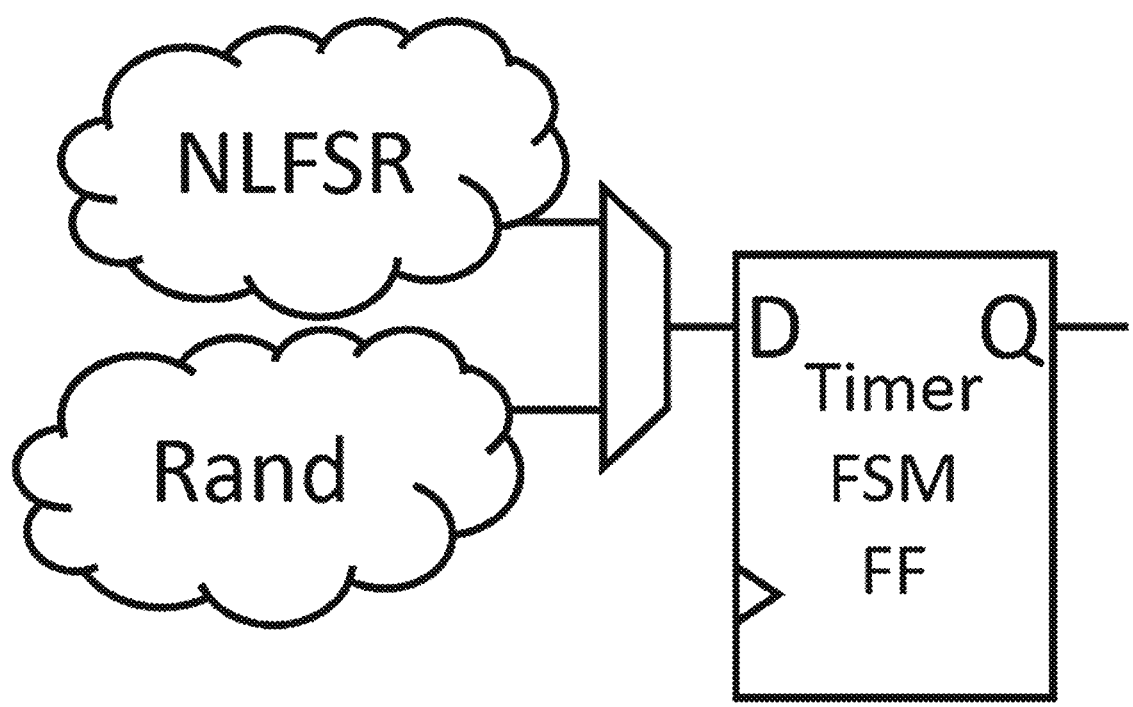
FIG. 8 shows a modification of a timer FSM to allow input logic multiplexing in accordance with various embodiments of the present disclosure.
Figure 9:
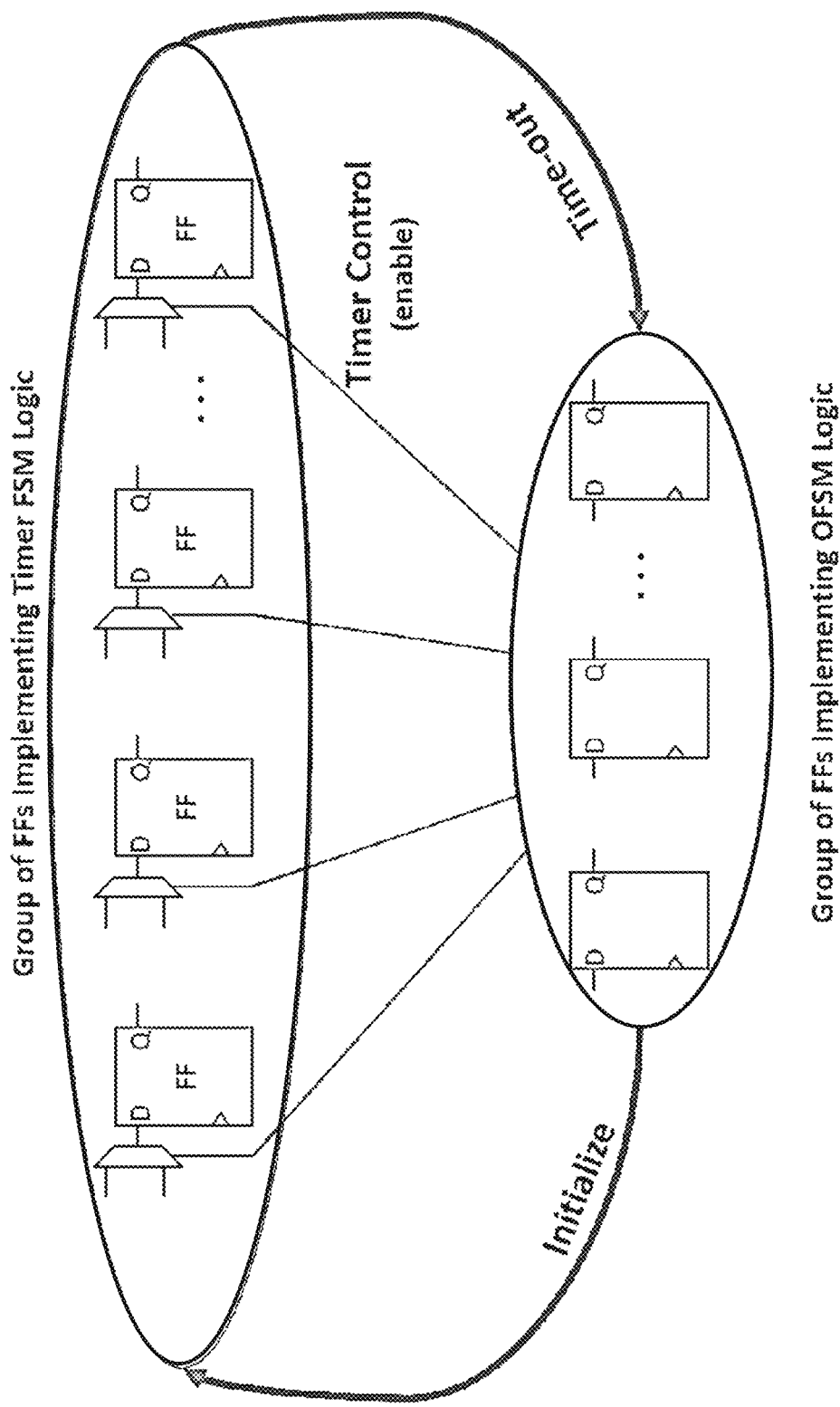
FIG. 9 shows an exemplary timer FSM being driven by an OFSM in accordance with various embodiments of the present disclosure.

In order to make sure that the timer FSM switches its states even in the locked mode of operation, each of the timer FSM flip-flops' input logic can be modified by multiplexing the NLFSR logic and random logic, as shown in FIG. 8. Correspondingly, FIG. 9 shows an exemplary timer FSM being driven by an OFSM, such that the OFSM initializes and enables the timer in the test enable state of the OFSM until the time-out occurs and the OFSM transitions to one of the dummy states of the OFSM. Accordingly, the enable signals generated by the OFSMs are used for selection of an active branch at any point of the operation of the timer FSM. By comparing FIG. 9 with FIG. 6, it is clear that the timer FSM flip-flops will have the exact same structures as the original design state flip-flops, thereby ensuring that the added timer FSM flip-flops are not discoverable by means of structural analysis.

In accordance with various embodiments, an exemplary timer FSM follows the following protocol sequence to allow testing of an IP design for $2^n$ number of cycles: (1) The OFSM checks a test key sequence being applied through primary inputs of the IP chip. During the test key application period, both the original design and the timer design go through random non-functional states as the OFSM enables signals to produce incorrect values to select the functional branches of the multiplexers. (2) The OFSM reaches a test enable state by checking and validating the test key. (3) The OFSM initializes the timer and original design to their initial state from any random states the timer and original design have reached. (4) The OFSM enables both the original design and the timer. (5) The timer starts to go through a maximum of $2^n$ states while in parallel, the functionality of the entire design can be tested for up to $2^n$ clock cycles, where n is chosen based on the amount of test patterns that need to be applied during testing the fabricated chip. (6) Once the timer reaches its final state and is about to restart the cycle of states, a time-out signal is sent to the OFSM. (7) The OFSM switches to a dummy state which causes the enable signals to have random and incorrect values, in which the design becomes non-functional again which will require resetting the design, re-applying the test key, and re-starting the test.

Advantages of the first approach for the timer FSM include that the design for the timer FSM ensures (1) Reaching the time-out condition and locking after a certain period of time, such that a maximum period of NLFSRs are guaranteed to go through a fixed number of states based on its size; (2) Adding the flip-flops in a secure fashion which does not create any structural differences for the added flip-flops compared to the other flip-flops; and (3) Incurring lower overhead by re-using the similar logic in different parts of the design (e.g., re-using enable signals from OFSM, re-using NLFSR logic used in HIRA superimposition for the timer, etc.).

Figure 10:
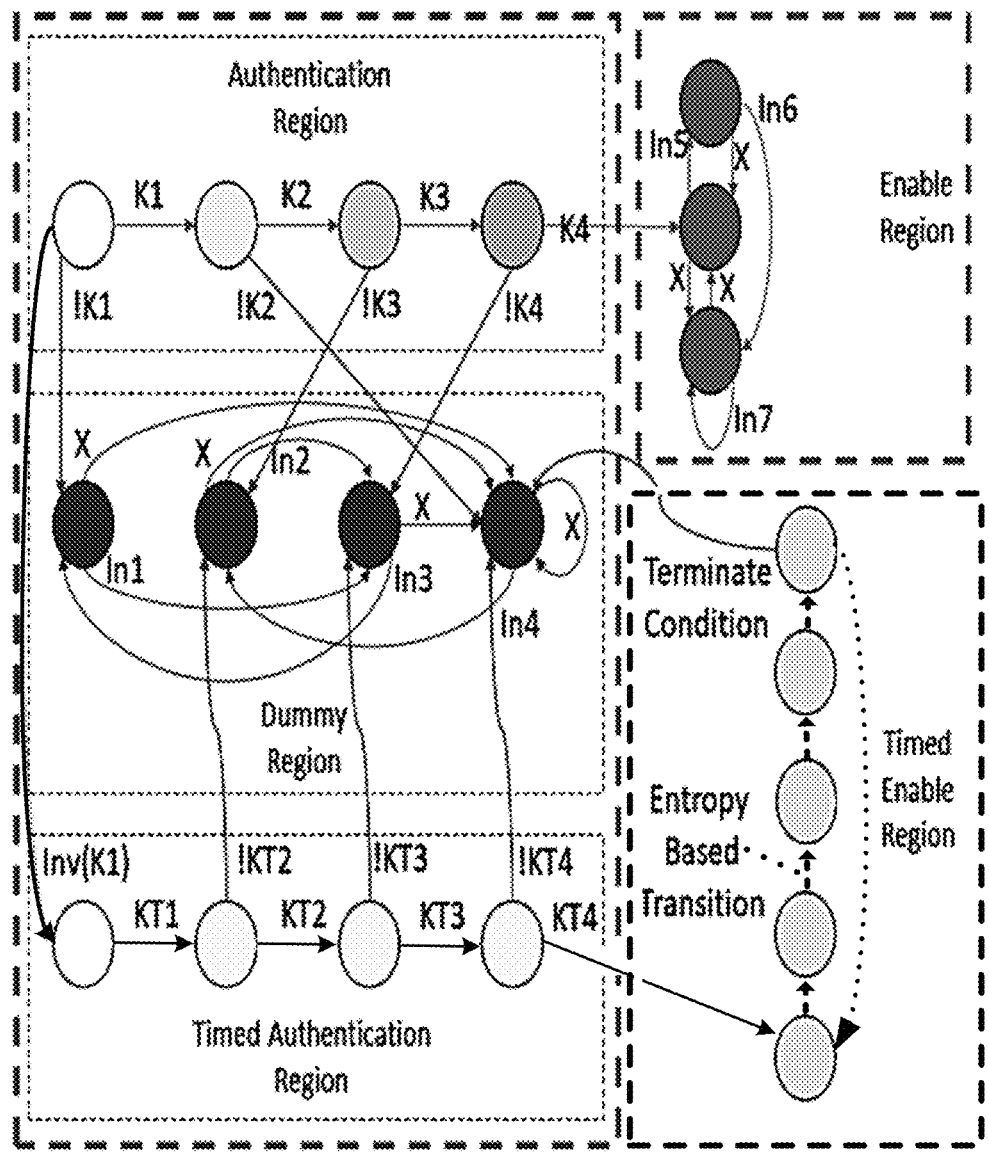
FIG. 10 is an overview of a modified OFSM that incorporates test key verification states and a timed enable region in accordance with various embodiments of the present disclosure.

For the second approach for the timer circuit, OFSMs are extended to include an additional key verification sequence, such that the sequence is implemented to verify the correctness of the test key. If the test key is correctly inserted, the OFSMs enter the test enable state, where the original function of the locked circuit is restored. FIG. 10 is an overview of a modified OFSM that incorporates test key verification states and a timed enable region in accordance with various embodiments of the present disclosure. As such, FIG. 10 shows how the OFSM is extended to hold both the original key and the test key verification state traversals. In various embodiments, the first round of the test key is the inverse of the first round of the original key to avoid any state transition conflict.

Figure 11:
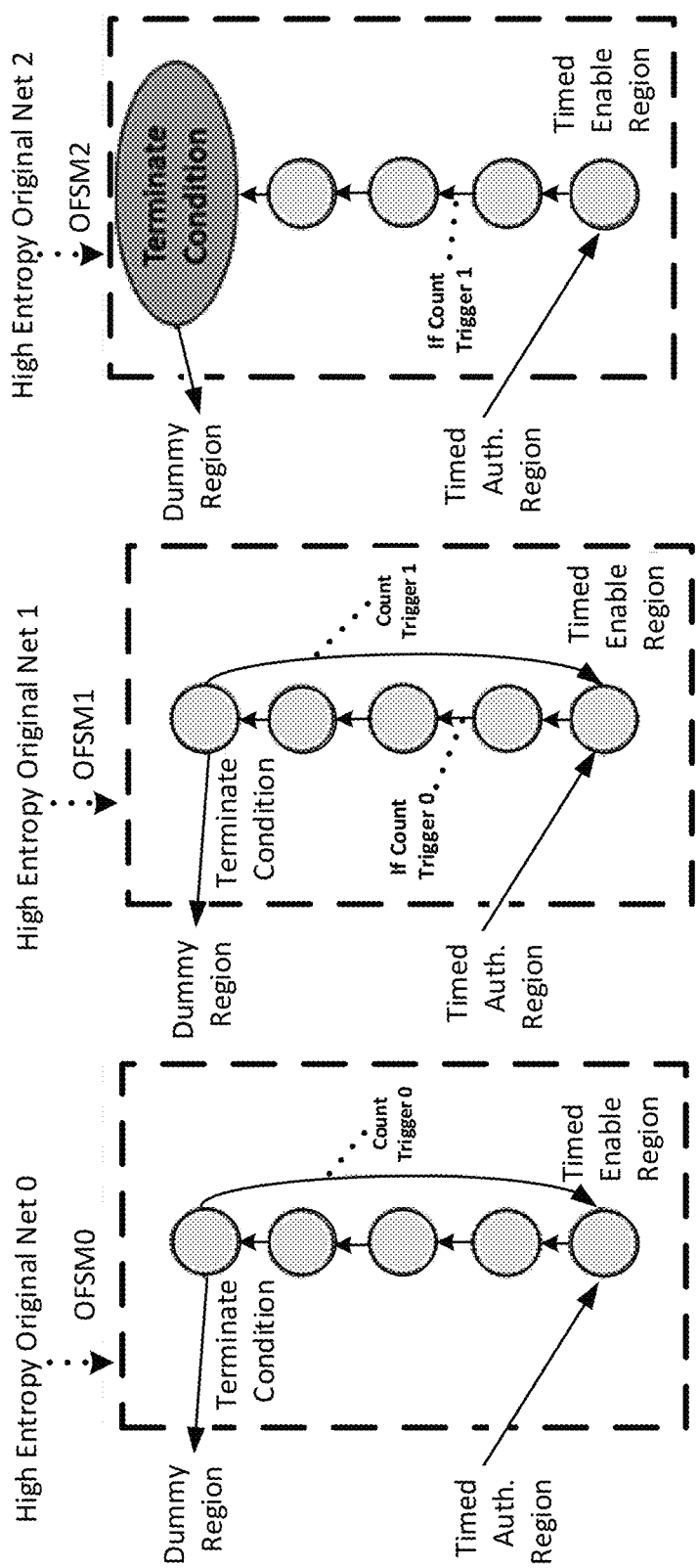
FIG. 11 shows an illustration of extended OFSMs behaving as counters in accordance with various embodiments of the present disclosure.

In various embodiments, when the current state is in the test enable region, OFSMs will start counting towards the time-out threshold. This counting process links all OFSMs to act as a dedicated counter, where the first OFSM acts as the least significant bit of the counter, and the last OFSM acts as the most significant bit to the counter. Accordingly, FIG. 11 shows an illustration of extended OFSMs behaving as counters for the timed enable region and shows how a counter is formed when the current state is in the test enable region. In various embodiments, an optional high entropy net can be used to further hide any structural signature and add dependency on the original circuit. Moreover, a conditioned state-traversal can be implemented in the test enable region, where the formed counter is incremented only if a high entropy signal is switched and the high entropy signal is taken from the original circuit and acts as a clock-enable signal for the test enable region. In various embodiments, two conditions are met for an OFSM to transition to the next timed enable-state—the high entropy net or signal must be high and the previous OFSM counter trigger must be high. A termination condition (e.g., all OFSMs go to the dummy region) occurs when the last OFSM reaches the last timed enable-state. The entropy net can provide two main benefits. First, it adds dependency on the original circuit, which hides any signature that may be exploited to identify the OFSMs. Second, the entropy net reduces the number of states needed to reach the time-out period since the high entropy net will always be slower than the main clock. However, a timed-out period cannot be precisely determined when using this approach, as the state-traversal behavior of the test enable region depends on the entropy of the selected nets, and the type of inputs applied to the circuit during the test period.

For evaluation purposes, the security of any obfuscation scheme needs to be evaluated against potential attacks. The exemplary TULIP methodology uses additional sequential logic that may be susceptible to reverse engineering attacks, especially in untrusted testing facilities. In order to quantify the level of security of the exemplary TULIP mechanism, two metrics (Black Box Complexity and White Box Complexity) are used based on the level of access the attacker has to the obfuscated design. Accordingly, it is assumed that the attacker has managed to obtain access to an unlocked chip to use as a golden reference. Using these quantifiable metrics, the TULIP locking mechanism is able to be shown to be strong enough to deter known attacks, even under conditions favorable to the attacker, as explained below.

A black-box attack can be carried out at any testing facility, where the attacker can get access to the locked IC but still needs the test key which can unlock the design. Here, the attacker is forced to treat the design as a black-box and is unable to reverse engineer the locked chip. As a result, the attacker must determine the unlocking test key by randomly applying input patterns to the obfuscated design. Even if the attacker is able to figure out the length of the key sequence, the primary input ports used in each key vector is unknown. Hence, the complexity of this kind of attack depends upon both the length of the key and the width of each key vector. Accordingly, Black-Box attack Complexity (BBC) can be quantified in terms of the length of the key sequence P, and the width of each key vector, Q as follows:

$$BBC = 2^{PQ} \quad (1)$$

This attack metric computes the minimum number of trials required to unlock the design. The value of the BBC metric does not consider the difficulty of determining the values of P and Q, which would make it harder to perform this kind of attack, thereby increasing the complexity.

For the white-box attack complexity, it is assumed that the attacker has access to the gate-level netlist/layout of the locked IC and is able to identify the state elements (flip-flops used in an FSM) from the design, which is a very strong assumption in favor of the attacker. Since an exemplary TULIP obfuscation method is implemented using these sequential elements, the attacker has to reconstruct the state space of the locked design to enable the original functionality from the netlist/layout, bypassing the locking mechanism. Thus, the attacker must choose a subset of the state flip-flops and force it to an enable state that unlocks the design. Assuming that the original design has n state flip-flops and r additional flip-flops are required to realize the timers and added FSMs, the White-Box Complexity (WBC) can be computed as follows:

$$WBC = {}^{n+r}C_r \times 2^T \quad (2)$$

As such, the WBC metric can be used to quantify the minimum number of trials required by the attacker to discover one of the enable states.

The attack complexity metrics are evaluated for both approaches of timer designs in exemplary systems and methods for Timed Unlocking and Locking of hardware IPs (TULIP). The black-box attack complexity value depends on two configurable design constraints: the length of the test key vector and the width of each key. As the authentication process remains identical for both approaches (FSM Timer and OFSM Extension), the BBC value is also the same for both approaches, as shown in Table 2 (below).

TABLE 2

| Timer design approach | Length of key sequence | Width of key vectors | BBC |
|---|---|---|---|
| FSM Timer | 64 | 2 | $2^{128}$ |
| OFSM Extension | 64 | 2 | $2^{128}$ |

The metric for white-box attack complexity is calculated for the two approaches considering that the number of state flip-flops added are same. The difference between the two timers is how the additional timer logic is implemented. The timer FSM used in the first approach (FSM Timer) is modified to have a similar structure to other FSMs in the design. The timer in the second approach (OFSM Extension) is the extension of an already added FSM. As a result, the timer flip-flops along with the sequential elements added as part of the OFSMs should not have any significant structural signature that can be identified by an attacker. Table 3 (below) shows the WBC values for each approach.

TABLE 3

| Timer design approach | # State flip-flops | # Added flip-flops | WBC |
|---|---|---|---|
| FSM Timer | 10 | 20 | $10^{13}$ |
| OFSM Extension | 10 | 20 | $10^{13}$ |

The complexity values can be similarly calculated for the functional key. There is no correlation between the test key and the functional key as they are validated using separate authentication regions. Also, two distinct sets of enable and dummy states are used to enable the designs, so there should be no correlation between the attack complexities of the two key paths. The accessibility of the enable region of the functional key in TULIP is a security concern. In case of a black-box attack, the only way to reach the enable states of the functional key is to reset the design and apply the correct functional key. If the size of the functional key is the same as the test key, the BBC remains the same for a regular obfuscated design (without timed locking) as the value for TULIP. The WBC would depend upon the difficulty of identifying the state flip-flops used in the OFSMs (before resizing) in the gate-level design. As more state elements are added in TULIP, the value of WBC should be higher than the regular obfuscated design. The complexity values for this scenario are tabulated in Table 4 (below) and Table 5 (below).

TABLE 4

| Obfuscation approach | Length of key sequence | Width of key vectors | BBC |
|---|---|---|---|
| W/O Timed Locking | 64 | 2 | $2^{128}$ |
| TULIP | 64 | 2 | $2^{128}$ |

TABLE 5

| Obfuscation approach | # State flip-flops | # OFSM flip-flops | # Timer flip-flops | WBC |
|---|---|---|---|---|
| W/O Timed Locking | 10 | 8 | 0 | $10^7$ |
| TULIP | 10 | 8 | 12 | $10^9$ |

In brief, the present disclosure presents a unique approach of Timed Unlocking and Locking of hardware IPs (TULIP) that supports two modes of operation. First, a functional mode is offered, where an original unlocking key is applied to completely unlock the functionality of the hardware IP circuit. Second, a temporarily unlocked mode is offered, where a test key is applied to unlock the functionality of the hardware IP circuit for a certain period of time. After which, the IP circuit automatically locks after the time period has passed. Such exemplary system and methods of Timed Unlocking and Locking of hardware IPs (TULIP) are shown to be scalable, secure, and lightweight.

Figure 12:
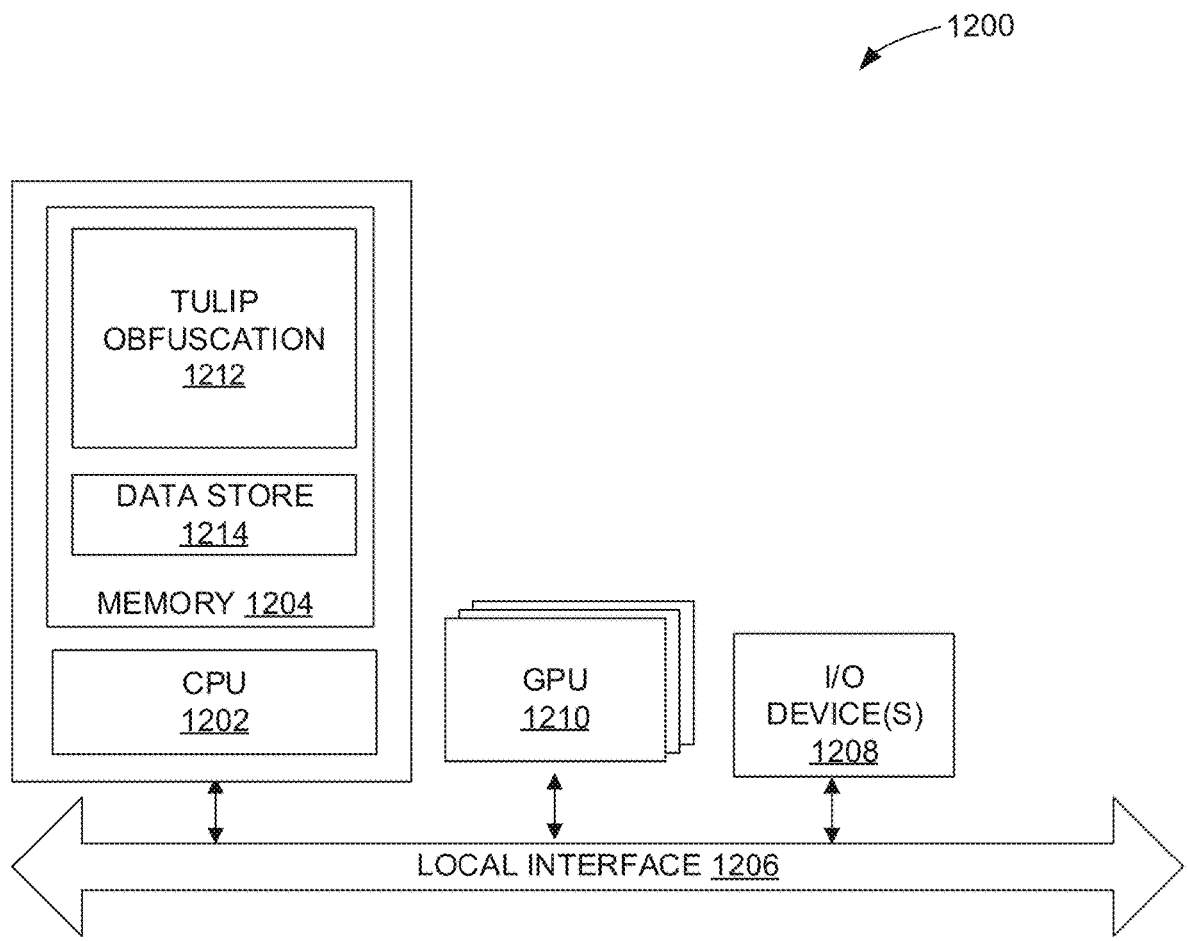
FIG. 12 depicts a schematic block diagram of a computing device that can be used to implement various embodiments of the present disclosure.

FIG. 12 depicts a schematic block diagram of a computing device 1200 that can be used to implement various embodiments of the present disclosure. An exemplary computing device 1200 includes at least one processor circuit, for example, having a processor (CPU) 1202 and a memory 1204, both of which are coupled to a local interface 1206, and one or more input and output (I/O) devices 1208. The local interface 1206 may comprise, for example, a data bus with an accompanying address/control bus or other bus structure as can be appreciated. The processor 1202 can perform various operations including any of the various operations described herein.

Stored in the memory 1204 are both data and several components that are executable by the processor 1202. In particular, stored in the memory 1204 and executable by the processor 1202 is a TULIP obfuscation routine 1212 and/or related programs, in accordance with embodiments of the present disclosure. Also stored in the memory 1204 may be a data store 1214 and other data. In addition, an operating system may be stored in the memory 1204 and executable by the processor 1202. The I/O devices 1208 may include input devices, for example but not limited to, a keyboard, touchscreen, mouse, etc. Furthermore, the I/O devices 1208 may also include output devices, for example but not limited to, a display, speaker, printer, etc.

Certain embodiments of the present disclosure can be implemented in hardware, software, firmware, or a combination thereof. If implemented in software, TULIP obfuscation logic or functionality; in accordance with embodiments of the present disclosure, are implemented in software or firmware that is stored in a memory and that is executed by a suitable instruction execution system. If implemented in hardware, the TULIP obfuscation logic or functionality can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As discussed, the present disclosure provides various systems and methods for timed unlocking and locking of hardware intellectual properties obfuscation in order to protect an integrated circuit. One such method among others comprises receiving a plurality of key inputs for enabling operation of the integrated circuit; determining whether the received key inputs match a functional key sequence for permanently enabling operation of the integrated circuit or a test key sequence for temporarily enabling operation of the integrated circuit until occurrence of a defined event; permanently enabling operation of the integrated circuit responsive to the received key inputs being determined to be a functional key sequence for permanently enabling operation of the integrated circuit; temporarily enabling operation of the integrated circuit responsive to the received key inputs being determined to be the test key sequence for temporarily enabling operation of the integrated circuit to perform testing of the functionality and disable thereafter; and locking sequential logic and combinational logic of the integrated circuit if the received key inputs are determined to not be either the functional key sequence or the test key sequence.

In one or more aspects of an exemplary system/method, the integrated circuit comprises a key-controlled locking mechanism, a first circuit corresponding to an original circuit, a second circuit corresponding to a locking control circuit, wherein the key-controlled locking mechanism enables the first circuit to be permanently active based on the plurality of key inputs matching the functional key sequence; and/or wherein the key-controlled locking mechanism enables the first circuit to be temporarily active before occurrence of the defined event and the second circuit to be active after occurrence of the defined event based on the plurality of key inputs matching the test key sequence.

In one or more aspects of an exemplary system/method, the defined event comprises an expiration of a set period of time based on clock cycles of the original circuit; and/or the defined event comprises a defined number of counts of switching transitions or a sequence of rare transitions in a finite state machine (FSM) from an original circuit signal having occurred.

Additionally, an exemplary method of protecting an integrated circuit design by locking sequential and combinational logic of the integrated circuit design comprises: obtaining a gate-level netlist for the integrated circuit design, wherein functionality of the integrated circuit design is enabled by entering of keys inputs; identifying control path state elements that constitute a finite state machine (FSM) within the integrated circuit design and any pseudo-state elements within the gate-level netlist for the integrated circuit design, wherein the pseudo-state elements constitute data path flip-flop circuit elements that impact a state transition of the FSM; adding one or more extra FSM elements using a multiplexer to an input of individual ones of a plurality of target elements of the integrated circuit design in parallel with original design logic at the input of the target element, wherein the plurality of target elements constitute the identified control path state elements and pseudo-state elements, wherein the one or more extra FSM elements are driven by an output of an obfuscation finite state machine that accepts a subset of the key inputs corresponding to a functional key sequence for facilitating a permanent mode of operation for the integrated circuit design or the subset of the key inputs corresponding to a test key sequence for facilitating a temporary mode of operation of the integrated circuit design until occurrence of a defined event, wherein occurrence of the defined event causes a corruption of the functionality of the integrated circuit design, wherein an input of incorrect keys that do not correspond to the functional key sequence and the test key sequence cause the corruption of the functionality of the integrated circuit design; adding a data path enable finite state machine to implement the corruption of the functionality of the integrated circuit design, wherein input values to the data path enable finite state machine correspond to a subset of the key inputs that do not match the functional key sequence or the test key sequence; and/or generating an obfuscated gate-level netlist of the integrated circuit design after completion of the adding operations.

Correspondingly, the present disclosure also provides systems for protecting an integrated circuit design by locking sequential and combinational logic of the integrated circuit design. One such system comprises a processor; and a tangible, non-transitory memory configured to communicate with the processor, in which the tangible, non-transitory memory has instructions stored thereon that, in response to execution by the processor, cause the processor to be capable of performing operations comprising: obtaining a gate-level netlist for the integrated circuit design, wherein functionality of the integrated circuit design is enabled by entering of key inputs; identifying control path state elements that constitute a finite state machine (FSM) within the integrated circuit design and any pseudo-state elements within the gate-level netlist for the integrated circuit design, wherein the pseudo-state elements constitute data path flip-flop circuit elements that impact a state transition of the FSM; adding one or more extra FSM elements using a multiplexer to an input of individual ones of a plurality of target elements of the integrated circuit design in parallel with original design logic at the input of the target element, wherein the plurality of target elements constitute the identified control path state elements and pseudo-state elements, wherein the one or more extra FSM elements are driven by an output of an obfuscation finite state machine that accepts a subset of the key inputs corresponding to a functional key sequence for facilitating a permanent mode of operation for the integrated circuit design or the subset of the key inputs corresponding to a test key sequence for facilitating a temporary mode of operation of the integrated circuit design until occurrence of a defined event, wherein occurrence of the defined event causes a corruption of the functionality of the integrated circuit design, wherein an input of incorrect keys that do not correspond to the functional key sequence and the test key sequence cause the corruption of the functionality of the integrated circuit design; adding a data path enable finite state machine to implement the corruption of the functionality of the integrated circuit design, wherein input values to the data path enable finite state machine correspond to a subset of the key inputs that do not match the functional key sequence or the test key sequence; and/or generating an obfuscated gate-level netlist of the integrated circuit design after completion of the adding operations.

In one or more aspects of an exemplary system/method, the integrated circuit comprises flattening the gate-level netlist by removing hierarchical boundaries; and/or merging an original circuit from the integrated circuit design with a locking control circuit, wherein inputs for both circuits are shared, wherein application of an incorrect key to the merged circuit corrupts a state transition and locks operation of the merged circuit.

In one or more aspects of an exemplary system/method, the defined event comprises an expiration of a set period of time based on clock cycles of the original circuit or a defined number of counts of switching transitions from an original circuit signal having occurred; a structure of an obfuscated circuit of the integrated circuit design after completion of the adding operations is modified to be different from a corresponding original circuit from the integrated circuit design; the control path state elements comprise flip-flop circuit elements having a feedback path; and/or the one or more extra FSM elements comprise non-linear feedback shift registers.

In one or more aspects of an exemplary system/method, the obfuscated gate-level netlist is designed to operate by: receiving a plurality of key inputs for enabling operation of an integrated circuit; determining whether the received key inputs correctly match the functional key sequence for permanently enabling operation of the integrated circuit or correctly match the test key sequence for temporarily enabling operation of the integrated circuit until occurrence of a defined event; and if the received key inputs are determined to be incorrect key inputs, locking sequential logic and combinational logic of the integrated circuit until correct key inputs are received.

It should be emphasized that the above-described embodiments are merely possible examples of implementations, merely set forth for a clear understanding of the principles of the present disclosure. Many variations and modifications may be made to the above-described embodiment(s) without departing substantially from the principles of the present disclosure. All such modifications and variations are intended to be included herein within the scope of this disclosure.

Therefore, at least the following is claimed:

1. A method of protecting an integrated circuit design by locking sequential and combinational logic of the integrated circuit design, the method comprising:

obtaining a gate-level netlist for the integrated circuit design, wherein functionality of the integrated circuit design is enabled by entering of key inputs;

identifying control path state elements that constitute a finite state machine (FSM) within the integrated circuit design and any pseudo-state elements within the gate-level netlist for the integrated circuit design, wherein the pseudo-state elements constitute data path flip-flop circuit elements that impact a state transition of the FSM;

adding one or more extra FSM elements using a multiplexer to an input of individual ones of a plurality of target elements of the integrated circuit design in parallel with original design logic at the input of the target element, wherein the plurality of target elements constitute the identified control path state elements and pseudo-state elements, wherein the one or more extra FSM elements are driven by an output of an obfuscation finite state machine that accepts a subset of the key inputs corresponding to a functional key sequence for facilitating a permanent mode of operation for the integrated circuit design or the subset of the key inputs corresponding to a test key sequence for facilitating a temporary mode of operation of the integrated circuit design until occurrence of a defined event, wherein occurrence of the defined event causes a corruption of the functionality of the integrated circuit design, wherein an input of incorrect keys that do not correspond to the functional key sequence and the test key sequence cause the corruption of the functionality of the integrated circuit design;

adding a data path enable finite state machine to implement the corruption of the functionality of the integrated circuit design, wherein input values to the data path enable finite state machine correspond to a subset of the key inputs that do not match the functional key sequence or the test key sequence; and generating an obfuscated gate-level netlist of the integrated circuit design after completion of the adding operations.

2. The method of claim 1, further comprising flattening the gate-level netlist by removing hierarchical boundaries.

3. The method of claim 1, further comprising merging an original circuit from the integrated circuit design with a locking control circuit, wherein inputs for both circuits are shared, wherein application of an incorrect key to the merged circuit corrupts a state transition and locks operation of the merged circuit.

4. The method of claim 3, wherein the defined event comprises an expiration of a set period of time based on clock cycles of the original circuit or a defined number of counts of switching transitions from an original circuit signal having occurred.

5. The method of claim 1, wherein a structure of an obfuscated circuit of the integrated circuit design after completion of the adding operations is modified to be different from a corresponding original circuit from the integrated circuit design.

6. The method of claim 1, wherein the control path state elements comprise flip-flop circuit elements having a feedback path.

7. The method of claim 1, wherein the one or more extra FSM elements comprise non-linear feedback shift registers.

8. The method of claim 1, wherein the obfuscated gate-level netlist is designed to operate by:

receiving a plurality of key inputs for enabling operation of an integrated circuit;

determining whether the received key inputs correctly match the functional key sequence for permanently enabling operation of the integrated circuit or correctly match the test key sequence for temporarily enabling operation of the integrated circuit until occurrence of a defined event; and if the received key inputs are determined to be incorrect key inputs, locking sequential logic and combinational logic of the integrated circuit until correct key inputs are received.

9. A system of protecting an integrated circuit design by locking sequential and combinational logic of the integrated circuit design, the system comprising:

a processor; and a tangible, non-transitory memory configured to communicate with the processor, the tangible, non-transitory memory having instructions stored thereon that, in response to execution by the processor, cause the processor to be capable of performing operations comprising:

obtaining a gate-level netlist for the integrated circuit design, wherein functionality of the integrated circuit design is enabled by entering of key inputs;

identifying control path state elements that constitute a finite state machine (FSM) within the integrated circuit design and any pseudo-state elements within the gate-level netlist for the integrated circuit design, wherein the pseudo-state elements constitute data path flip-flop circuit elements that impact a state transition of the FSM;

adding one or more extra FSM elements using a multiplexer to an input of individual ones of a plurality of target elements of the integrated circuit design in parallel with original design logic at the input of the target element, wherein the plurality of target elements constitute the identified control path state elements and pseudo-state elements, wherein the one or more extra FSM elements are driven by an output of an obfuscation finite state machine that accepts a subset of the key inputs corresponding to a functional key sequence for facilitating a permanent mode of operation for the integrated circuit design or the subset of the key inputs corresponding to a test key sequence for facilitating a temporary mode of operation of the integrated circuit design until occurrence of a defined event, wherein occurrence of the defined event causes a corruption of the functionality of the integrated circuit design, wherein an input of incorrect keys that do not correspond to the functional key sequence and the test key sequence cause the corruption of the functionality of the integrated circuit design;

adding a data path enable finite state machine to implement the corruption of the functionality of the integrated circuit design, wherein input values to the data path enable finite state machine correspond to a subset of the key inputs that do not match the functional key sequence or the test key sequence; and generating an obfuscated gate-level netlist of the integrated circuit design after completion of the adding operations.

10. The system of claim 9, wherein the operations comprise flattening the gate-level netlist by removing hierarchical boundaries.

11. The system of claim 9, wherein the operations further comprise merging an original circuit from the integrated circuit design with a locking control circuit, wherein inputs for both circuits are shared, wherein application of an incorrect key to the merged circuit corrupts a state transition and locks operation of the merged circuit.

12. The system of claim 11, wherein the defined event comprises an expiration of a set period of time based on clock cycles of the original circuit or a defined number of counts of switching transitions from an original circuit signal having occurred.

13. The system of claim 9, wherein a structure of an obfuscated circuit of the integrated circuit design after completion of the adding operations is modified to be different from a corresponding original circuit from the integrated circuit design.

14. The system of claim 9, wherein the control path state elements comprise flip-flop circuit elements having a feedback path.

15. The system of claim 9, wherein the one or more extra FSM elements comprise non-linear feedback shift registers.

16. The system of claim 9, wherein the obfuscated gate-level netlist is designed to operate by:
  receiving a plurality of key inputs for enabling operation of an integrated circuit;
  determining whether the received key inputs correctly match the functional key sequence for permanently enabling operation of the integrated circuit or correctly match the test key sequence for temporarily enabling operation of the integrated circuit until occurrence of the defined event; and
  if the received key inputs are determined to be incorrect key inputs, locking sequential logic and combinational logic of the integrated circuit until correct key inputs are received.

17. A non-transitory computer readable storage medium having instructions stored thereon that, in response to execution by a computer-based system, cause the computer-based system to perform operations comprising:
  obtaining a gate-level netlist for an integrated circuit design, wherein functionality of the integrated circuit design is enabled by entering of key inputs;
  identifying control path state elements that constitute a finite state machine (FSM) within the integrated circuit design and any pseudo-state elements within the gate-level netlist for the integrated circuit design, wherein the pseudo-state elements constitute data path flip-flop circuit elements that impact a state transition of the FSM;
  adding one or more extra FSM elements using a multiplexer to an input of individual ones of a plurality of target elements of the integrated circuit design in parallel with original design logic at the input of the target element, wherein the plurality of target elements constitute the identified control path state elements and pseudo-state elements, wherein the one or more extra FSM elements are driven by an output of an obfuscation finite state machine that accepts a subset of the key inputs corresponding to a functional key sequence for facilitating a permanent mode of operation for the integrated circuit design or the subset of the key inputs corresponding to a test key sequence for facilitating a temporary mode of operation of the integrated circuit design until occurrence of a defined event, wherein occurrence of the defined event causes a corruption of the functionality of the integrated circuit design, wherein an input of incorrect keys that do not correspond to the functional key sequence and the test key sequence cause the corruption of the functionality of the integrated circuit design;
  adding a data path enable finite state machine to implement the corruption of the functionality of the integrated circuit design, wherein input values to the data path enable finite state machine correspond to a subset of the key inputs that do not match the functional key sequence or the test key sequence; and
  generating an obfuscated gate-level netlist of the integrated circuit design after completion of the adding operations.

18. The non-transitory computer readable storage medium of claim 17, wherein the operations comprise flattening the gate-level netlist by removing hierarchical boundaries.

19. The non-transitory computer readable storage medium of claim 17, wherein the operations further comprise merging an original circuit from the integrated circuit design with a locking control circuit, wherein inputs for both circuits are shared, wherein application of an incorrect key to the merged circuit corrupts a state transition and locks operation of the merged circuit.

20. The non-transitory computer readable storage medium of claim 19, wherein the defined event comprises an expiration of a set period of time based on clock cycles of the original circuit or a defined number of counts of switching transitions from an original circuit signal having occurred.

* * * * *